United States Patent
Trojahn et al.

(10) Patent No.: US 12,546,361 B2
(45) Date of Patent: Feb. 10, 2026

(54) METHOD FOR PRODUCING A ROLLING BEARING COMPONENT

(71) Applicant: Schaeffler Technologies AG & Co. KG, Herzogenaurach (DE)

(72) Inventors: Werner Trojahn, Niederwerrn (DE); Markus Dinkel, Würzburg (DE); Johannes Moeller, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 29 days.

(21) Appl. No.: 18/270,260

(22) PCT Filed: Dec. 14, 2021

(86) PCT No.: PCT/DE2021/100998
§ 371 (c)(1),
(2) Date: Jun. 29, 2023

(87) PCT Pub. No.: WO2022/148510
PCT Pub. Date: Jul. 14, 2022

(65) Prior Publication Data
US 2024/0060531 A1 Feb. 22, 2024

(30) Foreign Application Priority Data

Jan. 8, 2021 (DE) ............ 10 2021 100 210.9
Dec. 10, 2021 (DE) ............ 10 2021 132 703.2

(51) Int. Cl.
*C21D 9/40* (2006.01)
*B21D 53/10* (2006.01)
(Continued)

(52) U.S. Cl.
CPC ............ *F16C 19/04* (2013.01); *B21D 53/10* (2013.01); *C21D 1/18* (2013.01); *C21D 9/40* (2013.01);
(Continued)

(58) Field of Classification Search
CPC ...... B21H 1/16; B23P 15/003; F16C 2223/10; C21D 9/36; C21D 9/38; C21D 9/40
See application file for complete search history.

(56) References Cited

U.S. PATENT DOCUMENTS

2010/0296764 A1   11/2010   Strandell

FOREIGN PATENT DOCUMENTS

DE    102006052834 A1    5/2008
DE    102006059050 A1    6/2008
(Continued)

OTHER PUBLICATIONS

Written Opinion of the International Searching Authority for International Application No. PCT/DE2021/100998 (Year: 2022).*

*Primary Examiner* — Christopher J. Besler

(57) ABSTRACT

A method for producing a rolling bearing component includes providing a rolling bearing component formed from a rolling bearing steel, heating the rolling bearing component to form an austenitic microstructure, and cooling the rolling bearing component in a warm salt bath to a temperature below a martensite start temperature of the rolling bearing steel. The rolling bearing component has a wall thickness or a diameter of at least 85 mm at at least one point and includes a martensitic microstructure in an edge layer region and a microstructure consisting of pearlite or upper bainite in a core region after the cooling. A rolling bearing component produced by the method and a rolling bearing comprising the rolling bearing component are also disclosed.

5 Claims, 1 Drawing Sheet

(51) Int. Cl.
*C21D 1/18* (2006.01)
*C21D 9/36* (2006.01)
*C21D 9/38* (2006.01)
*F16C 19/04* (2006.01)

(52) U.S. Cl.
CPC ............... *C21D 9/36* (2013.01); *C21D 9/38* (2013.01); *C21D 2211/002* (2013.01); *C21D 2211/008* (2013.01); *C21D 2211/009* (2013.01)

(56) References Cited

FOREIGN PATENT DOCUMENTS

| | | |
|---|---|---|
| DE | 102010027011 A1 | 1/2012 |
| DE | 102016223680 A1 | 5/2018 |
| EP | 0908257 A2 | 4/1999 |
| EP | 2045339 A1 | 4/2009 |
| WO | 2009045147 A1 | 4/2009 |

\* cited by examiner

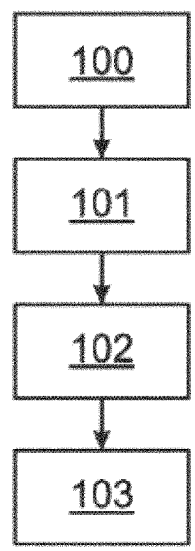
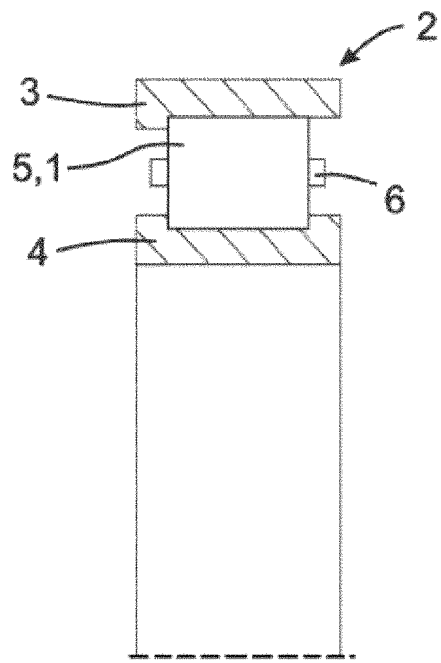
Fig. 1　　　　Fig. 2
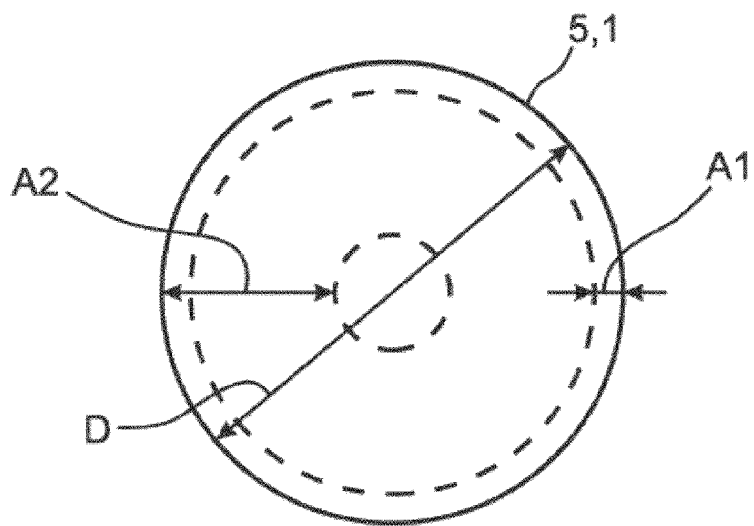
Fig. 3

METHOD FOR PRODUCING A ROLLING BEARING COMPONENT

CROSS-REFERENCE TO RELATED APPLICATIONS

This application is the United States National Phase of PCT Appln. No. PCT/DE2021/100998 filed Dec. 14, 2021, which claims priority to German Application Nos. DE102021100210.9 filed Jan. 8, 2021 and DE102021132703.2 filed Dec. 10, 2021, the entire disclosures of which are incorporated by reference herein.

TECHNICAL FIELD

The present disclosure relates to a method for producing a rolling bearing component, with the rolling bearing component being formed from a rolling bearing steel. Furthermore, the present disclosure relates to a rolling bearing component and a rolling bearing.

BACKGROUND

DE 10 2006 052 834 A1 discloses a method for producing a rolling bearing ring, in which a bearing ring is produced from a low-alloy, through-hardenable steel with a carbon content of more than 0.5 wt % and total chromium, nickel, and molybdenum content of between 1.4 wt % and 3.0 wt %. The bearing ring undergoes a hardening treatment in which the bearing ring is heated to an external temperature between 800° C. and 880° C. and then quenched until it reaches a temperature below 150° C.

DE 10 2006 059 050 A1 describes a method for the heat treatment of rolling bearing components made of through-hardened bainitic rolling bearing steel with residual compressive stresses in the edge region and a maximum martensite content of 5% and a maximum retained austenite content of 3%. For this purpose, a two-stage heat treatment is carried out in which the component is cooled from the austenitization temperature in a salt bath with a temperature in the range of 180 to 210° C. slightly below the martensite start temperature and is held until a temperature equalization. The component is then heated in another bath to a temperature slightly above the martensite start temperature. The result is a bainitic microstructure in the entire component.

In the case of large rolling bearings with a diameter of around one meter or more, the rolling elements are dimensioned accordingly. The components often have cross-sections or wall thicknesses of 85 mm or more. So that such components can be heat treated in a technically problem-free manner, high-alloy steels are used, which incur corresponding costs. In the case of bearing rings, larger cross-sections are also made from through-hardenable steel in a shell-hardened design. This possibility does not exist for large-format rolling elements, since such high tensile stresses occur at the edges (=transition from lateral surface to front side) in the event of abrupt quenching that there is a high probability of a crack formation.

SUMMARY

The present disclosure further develops a method for producing a rolling bearing component from a rolling bearing steel which has a wall thickness or a diameter of at least 85 mm at at least one point, and provides a rolling bearing component produced by means of the method and a rolling bearing.

In a method according to the present disclosure for producing a rolling bearing component, the rolling bearing component is formed from a rolling bearing steel and has a wall thickness or a diameter of at least 85 mm at at least one point. The rolling bearing component is heated to form an austenitic microstructure and is then cooled in a warm salt bath below the martensite start temperature of the rolling bearing steel, such that the rolling bearing component is formed having a martensitic microstructure in an edge layer region of the rolling bearing component and having a microstructure consisting of pearlite and/or upper bainite in a core region of the rolling bearing component.

In other words, the rolling bearing component is first formed from a rolling bearing steel. 100CrMo7-3 or 100CrMnSi6-4 may be suitable as the rolling bearing steel from which the rolling bearing component is formed. At the beginning of the heat treatment, the rolling bearing component is heated to the austenitization temperature and then quenched. The quenching rate is selected in such a way that cracking in the surface of the rolling bearing component is prevented, but at the same time a technically optimal and roll-resistant shell arises on the lateral surface of the rolling bearing component with as little delay as possible. The quenching rate is selected, for example, depending on the geometry of the rolling bearing component and the quenching medium, i.e., the warm salt bath, e.g., the heat capacity thereof.

In the warm salt bath, the rolling bearing component is, for example, cooled to a temperature T in the range from 20 to 70° C., e.g., 50 to 70° C., below the martensite start temperature of the rolling bearing steel.

The temperature T may be kept constant over a period of 10 to 20 minutes.

During quenching in the warm salt bath, a phase transformation takes place in the microstructure of the rolling bearing component, and an essentially martensitic microstructure forms on the surface or in the region close to the surface. Consequently, a martensitic surface layer hardening takes place as a result of the quenching. Furthermore, due to the slower cooling in regions of the rolling bearing component that are far from the surface, e.g., in the core or in the core region of the rolling bearing component, a substantially pearlitic and/or a substantially bainitic microstructure is formed. When considering the continuous time-temperature diagram, i.e., the graphic representation of the transformation processes in the microstructure of an alloy as a function of temperature and time, the pearlite field and/or the bainite field is passed through during quenching for regions of the rolling bearing component that are far from the surface, and the corresponding microstructure adjusts. Which microstructure is established essentially depends on the alloy composition and the geometry of the rolling bearing component.

A martensite or a martensitic microstructure is to be understood as meaning a metastable microstructure which is formed from the austenitic starting microstructure without diffusion, e.g., by rapid quenching of the steel starting from the hardening or austenitization temperature. The increase in hardness during the transformation occurs because the carbon atoms dissolved in the austenite lattice can no longer leave the lattice positions thereof due to the short time span of the transformation, and the austenite folds over into martensite without diffusion and the enclosed carbon atoms thus strain the crystal lattice. Martensite is hard, highstrength, but also brittle, which is why such steels are usually tempered after quenching to avoid any cracks.

Pearlite, on the other hand, is a lamellar, eutectoid structural component of steel, i.e., a phase mixture of ferrite and cementite that occurs as a result of coupled crystallization in iron-carbon alloys with carbon contents between 0.02% and 6.67%. Pearlite is softer than martensite. A microstructure consisting of pearlite is to be understood as meaning that the microstructure in the core region of the rolling bearing component essentially consists of pearlite. Thus, the microstructure consists of pearlite even if it does not have a completely and exclusively pearlitic microstructure. Even a slight deviation from a completely pearlitic microstructure, in which other microstructures can also be present, is therefore still to be understood as a microstructure consisting of pearlite within the meaning of this disclosure.

Bainite is a microstructure that is formed at temperatures below pearlite formation up to martensite formation, both isothermally and with continuous cooling. Upper bainite consists of needle-shaped ferrite arranged in packets. Between the individual ferrite needles there are more or less continuous films of carbides parallel to the needle axis. A distinction must be made between upper bainite and lower bainite, which, on the other hand, consists of ferrite plates within which the carbides form at an angle of 60° to the needle axis. Bainite is also softer than martensite but harder than pearlite. A microstructure consisting of upper bainite is to be understood as meaning that the microstructure in the core region of the rolling bearing component essentially consists of upper bainite. Thus, the microstructure consists of upper bainite even if it is not entirely and exclusively upper bainite. Even a slight deviation from a completely bainitic microstructure, in which other microstructures can also be present, is therefore still to be understood as a microstructure consisting of upper bainite within the meaning of this disclosure.

The rolling bearing component formed using the method according to the present disclosure can be formed as a component blank which is formed close to the final geometry, and further treatment, e.g., mechanical processing, takes place after the component has cooled to bring the rolling bearing component into the final geometry. Alternatively, the component can already be in the final geometry thereof before the heat treatment. The rolling bearing component is designed, for example, as an inner ring, an outer ring, or as a rolling element of a rolling bearing.

The hardenability of the respective steel is determined by the choice of alloy composition. In the case of through-hardenable steels, such as 100CrMnSi6-4, the hardenability can also be changed by changing the carbon content and the content of dissolved alloying elements, such as chromium, via the level of the austenitization temperature. The required state of solution for the geometry of the rolling bearing component to be treated and the quenching effect can be determined in advance using software or tests.

The warm salt bath may have a temperature between 150° C. and 210° C. For example, the warm salt bath may have a temperature of between 160° C. and 200° C., depending on the material. The composition of the warm salt bath is selected with regard to the requirements for the quenching parameters, and a quenching rate can be set at which the martensitic microstructure forms on the surface of the rolling bearing component and a microstructure consisting of pearlite and/or upper bainite forms away from the surface, e.g., in the core of the rolling bearing component. For example, the warm salt bath may have a water content of 0.5 to 1%.

Furthermore, the cooling process is adjusted and, if necessary, extended by the warm salt bath in such a way that the temperatures of the edge and core of the rolling bearing component can equalize. The associated advantages are reduced crack formation due to thermal stress. Furthermore, lower residual stresses can be achieved in rolling bearing components with variable dimensions, size, and weight.

A cooling rate between the austenitization temperature and the salt bath temperature may be in the range of 5 to 10 K/s, depending on the wall thickness or cross-section of the rolling bearing component.

The rolling bearing component may be cooled to room temperature after the temperature of the warm salt bath has been reached. As soon as the temperature of the rolling bearing component has equalized to the temperature of the warm salt bath, the rolling bearing component is removed from the bath so that the rolling bearing component can continue to cool down to room temperature. Room temperature means a temperature between 18° C. and 25° C., e.g., between 20° C. and 25° C.

The rolling bearing component according to the present disclosure has a wall thickness or a diameter of at least 85 mm, e.g., at least 200 mm. The wall thickness is considered here in the case of a rolling bearing ring, and the diameter thereof is considered in the case of a rolling element.

The rolling bearing component formed using the method according to the present disclosure consists of martensite in an edge layer region up to at least a depth below a surface of the rolling bearing component of 10 mm and has a hardness in the range from 60 HRC to 65 HRC. A hardness of 60 HRC (Rockwell hardness) corresponds to a Vickers hardness of about 700 HV and a hardness of 65 HRC corresponds to a Vickers hardness of about 830 HV. Consequently, a rolling bearing component according to the invention has a hardness of between 60 HRC and 65 HRC and a martensitic microstructure up to at least a first surface separation of 10 mm.

The HRC unit consists of HR (Rockwell hardness) as a designation of the test method, followed by another letter, here C, which indicates the scale and thus the test forces and bodies. A diamond cone with a 120° point angle and a preliminary test force of 98.0665 N is used for scale C (C stands for "cone"). The additional test force for scale C is 1372.931 N.

Furthermore, the rolling bearing component according to the present disclosure may have a hardness in the range from 30 HRC to 35 HRC in the core region thereof. A hardness of 30 HRC corresponds to a Vickers hardness of about 300 HV and a hardness of 35 HRC corresponds to a Vickers hardness of about 345 HV. Consequently, the rolling bearing component according to the present disclosure may have a hardness in the range from 30 HRC to 35 HRC and a pearlitic and/or bainitic microstructure in the core region thereof.

This means that the rolling bearing component consists of martensite in an edge layer region and pearlite and/or upper bainite in the core region.

In rolling bearing components with wall thicknesses or cross-sections of at least 200 mm, the pearlitic and/or bainitic microstructure that forms the core region may be present from a depth below the surface of the component of 70 mm.

A rolling bearing according to the present disclosure includes an outer ring and/or an inner ring and a multiplicity of rolling elements which roll on the outer ring and/or on the inner ring. The outer ring and/or the inner ring and/or the respective rolling element is a rolling bearing component according to the previous embodiments. In other words, either only the outer ring, only the inner ring, only the rolling elements or any combination of the components mentioned can be designed as a rolling bearing component according to the present disclosure, which has an essentially martensitic microstructure on the surface and an essentially pearlitic and/or upper bainite microstructure.

The above statements on the method apply equally to the rolling bearing component according to the present disclosure and to the rolling bearing according to the present disclosure, and vice versa.

BRIEF DESCRIPTION OF THE DRAWINGS

Further measures are illustrated below together with the description of exemplary embodiments of the disclosure using the figures. In the figures, identical or similar elements are provided with the same reference symbols. In the figures:

FIG. 1 shows a highly schematic sectional view of a rolling bearing according to the disclosure according to an example embodiment, FIG. 2 shows a schematic cross-section of a rolling bearing component according to the disclosure of the rolling bearing according to FIG. 1, and FIG. 3 shows a schematic block diagram of a method according to the disclosure for producing the rolling bearing component according to FIG. 2.

DETAILED DESCRIPTION

According to FIG. 1, a method according to the disclosure for producing a rolling bearing component 1 designed as a rolling element 5, which is shown in FIGS. 2 and 3, is visualized according to a block diagram. In other words, the rolling element 5 is to be understood as a rolling bearing component 1 in the present case. An exemplary rolling element 5 is shown installed in a rolling bearing 2 in FIG. 2, wherein the rolling element 5 is shown in cross-section in FIG. 3.

In FIG. 1 in a first method step 100, the rolling element 5, which is designed according to FIGS. 2 and 3 as a cylindrical roller with a diameter D of at least 85 mm, in this case 200 mm, is made from the material 100CrMo7-3. A large number of rolling elements 5 produced in this way are arranged spatially between an outer ring 3 and an inner ring 4 and in the circumferential direction by a cage 6 in a rolling bearing 2 designed and assembled according to FIG. 2. The outer ring 3 and/or the inner ring 4 can also be made of 100CrMo7-3 and have the same heat treatment. The heat treatment is explained below. Alternatively, the rolling element 5, the inner ring 4, and the outer ring 3 can be made from 100CrMnSi6-4.

In a second method step 101, the rolling element 5 is heated to a hardening or austenitization temperature to form an austenitic microstructure and is kept at this temperature until the microstructure has been completely austenitized. Then, in a third method step 102, the rolling element 5 is fed into a warm salt bath and cooled. The warm salt bath has a temperature between 150° C. and 210° C. depending on the properties and the mixing ratio of the warm salt bath, the material properties of the rolling bearing component 1, and the austenitization temperature. By means of the warm salt bath, the rolling element 5 is cooled at a controlled cooling rate, e.g., in a range from 5 to 10 K/s, wherein a phase transformation of the microstructure takes place.

The austenitic microstructure on the surface of the rolling element 5 converts to a martensitic microstructure due to the comparatively rapid cooling. In other words, after cooling, the rolling element 5 has a martensitic microstructure on the surface, e.g., in an edge layer region down to at least a depth A1 below the surface of the rolling element 5 of 10 mm, see FIG. 3. The greater the distance from the surface of the rolling element 5, the slower the cooling of the rolling element 5 proceeds, so that a microstructure consisting of pearlite and/or upper bainite is formed in the core region of the rolling bearing component 1. In other words, in the core region at cross-sections of at least 200 mm, e.g., at a depth A2 below the surface of the rolling element 5 of 70 mm, cf. FIG. 3, the rolling bearing component 1 has a microstructure consisting essentially of pearlite. Depending on the geometry and dimensions of the rolling element 5, a microstructure consisting essentially of upper bainite can also form. Both upper bainite and pearlite are softer than martensite, so that a comparatively hard shell with a hardness in the range of 60 HRC to 65 HRC forms on the rolling element 5 in the edge layer region. In contrast, the pearlitic or bainitic microstructure of the rolling element 5 has a hardness in the range of 30 HRC to 35 HRC in the core region.

In a fourth method step 103, after reaching the temperature of the warm salt bath, i.e., when the rolling element 5 has a temperature that corresponds to the temperature of the warm salt bath or is in the range of the temperature of the warm salt bath, the rolling element 5 is removed from the warm salt bath and is brought to room temperature, i.e., to about 20° C. With such a heat treatment, rolling bearing components with larger dimensions can be produced more cost-effectively, since a roll-resistant surface, in the case of the rolling element a roll-resistant lateral surface or raceway, is created even with materials with a lower alloy content by such an adapted heat treatment, and the rolling bearing component does not crack during quenching.

It is conceivable that further heat treatment steps, for example tempering, would be carried out to reduce the thermally induced stresses within the rolling element 5. Furthermore, a mechanical post-treatment can be carried out to bring the rolling element 5 into the final geometry thereof.

REFERENCE NUMERALS

1 Rolling bearing component
2 Rolling bearing
3 Outer ring
4 Inner ring
5 Rolling element
6 Cage
100 First method step
101 Second method step
102 Third method step
103 Fourth method step
A1 Depth below a surface of the rolling bearing component
A2 Depth below a surface of the rolling bearing component
D Diameter

The invention claimed is:

1. A method for producing and heat treating a rolling bearing component, wherein the rolling bearing component is formed from a rolling bearing steel and has a wall thickness or a diameter of at least 85 mm, wherein the rolling bearing component is heated to form an austenitic microstructure and is then cooled in a warm salt bath below the martensite start temperature of the rolling bearing steel, such that the rolling bearing component is formed having a martensitic microstructure in an edge layer region of the rolling bearing component and having a microstructure consisting of pearlite or upper bainite in a core region of the rolling bearing component.

2. The method according to claim 1,
wherein, in the warm salt bath, the rolling bearing component is cooled to a temperature T in the range from 20 to 70° C. below the martensite start temperature of the rolling bearing steel.

3. The method according to claim 2,
wherein the temperature T is kept constant over a period of 10 to 20 minutes.

4. The method according to one of claim 1,
wherein the warm salt bath has a temperature between 150° C. and 210° C.

5. The method according to one of claim 1,
wherein the rolling bearing component is cooled to room temperature after the temperature of the warm salt bath has been reached.

\* \* \* \* \*